United States Patent
Nara et al.

(10) Patent No.: US 9,244,696 B2
(45) Date of Patent: *Jan. 26, 2016

(54) IN-CAR INFORMATION SYSTEM, INFORMATION TERMINAL, AND APPLICATION EXECUTION METHOD

(71) Applicant: Clarion Co., Ltd., Saitama-shi, Saitama (JP)

(72) Inventors: Norikazu Nara, Matsudo (JP); Noriyuki Abe, Yokohama (JP); Kimio Okamoto, Yokohama (JP); Ryohei Kato, Yokohama (JP); Masafumi Naitou, Saitama (JP); Katsuya Matsuyuki, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 237 days.

This patent is subject to a terminal disclaimer.

(21) Appl. No.: 13/857,596

(22) Filed: Apr. 5, 2013

(65) Prior Publication Data
US 2013/0305262 A1 Nov. 14, 2013

(30) Foreign Application Priority Data

Apr. 6, 2012 (JP) .................................. 2012-087044

(51) Int. Cl.
*G06F 3/00* (2006.01)
*G06F 9/44* (2006.01)
*G06F 9/46* (2006.01)
*G06F 13/00* (2006.01)
*G06F 3/0482* (2013.01)
*H04M 1/60* (2006.01)

(52) U.S. Cl.
CPC ............ *G06F 9/4425* (2013.01); *G06F 3/0482* (2013.01); *G06F 9/4423* (2013.01); *H04M 1/6091* (2013.01)

(58) Field of Classification Search
None
See application file for complete search history.

(56) References Cited

U.S. PATENT DOCUMENTS

| 2007/0291664 | A1 | 12/2007 | Weyl et al. |
| 2010/0127996 | A1 | 5/2010 | Kitahara et al. |
| 2010/0134242 | A1* | 6/2010 | Ohta et al. ..................... 340/5.1 |
| 2013/0190978 | A1 | 7/2013 | Kato et al. |

FOREIGN PATENT DOCUMENTS

| JP | 2011-262853 | * 11/2011 |
| JP | 2011-248768 | 12/2011 |

(Continued)

OTHER PUBLICATIONS

Extended European Search Report dated Oct. 30, 2013 (eleven (11) pages).

(Continued)

*Primary Examiner* — Emerson Puente
*Assistant Examiner* — Kacy Verdi
(74) *Attorney, Agent, or Firm* — Crowell & Moring LLP

(57) ABSTRACT

An in-car information system includes a portable information terminal and an in-car device. The information terminal includes a storage unit in which applications are stored and a control unit that executes an application manager. The application manager has a launch function that enables execution of the application stored in the storage unit in the foreground and a communication function that enables execution of communication processing in the background to allow the information terminal and the in-car device to exchange information.

9 Claims, 7 Drawing Sheets

(56) References Cited

FOREIGN PATENT DOCUMENTS

| JP | 2012-8968 A | 1/2012 |
| JP | 2012-10287 A | 1/2012 |
| WO | WO 2006/063603 A1 | 6/2006 |
| WO | WO 2008/091727 A1 | 7/2008 |
| WO | WO 2011/047037 A1 | 4/2011 |
| WO | WO 2012/036279 A1 | 3/2012 |

OTHER PUBLICATIONS

Partial European Search Report Dated Jul. 18, 2013 {Five (5) pages}.
Corresponding Japanese Office Action dated Nov. 24, 2015 with English-language.

* cited by examiner

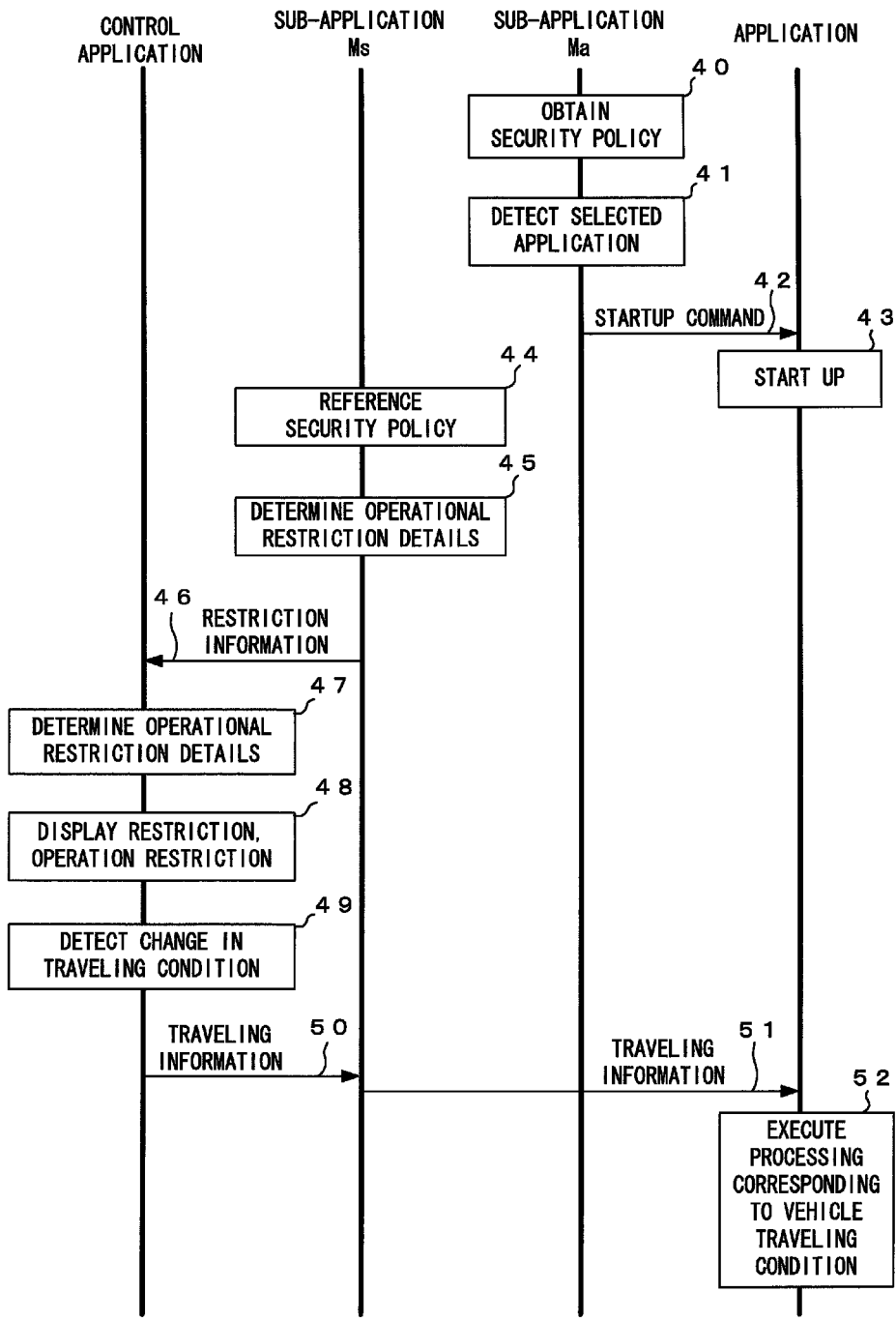

IN-CAR INFORMATION SYSTEM, INFORMATION TERMINAL, AND APPLICATION EXECUTION METHOD

INCORPORATION BY REFERENCE

The disclosure of the following priority application is herein incorporated by reference: Japanese Patent Application No. 2012-87044 filed Apr. 6, 2012

BACKGROUND OF THE INVENTION

1. Field of the Invention

The present invention relates to an in-car information system, and an information terminal and an application execution method used in the in-car information system.

2. Description of Related Art

There are systems known in the related art that coordinate operations of a portable information terminal such as a portable telephone or a smart phone and an onboard device so as to allow an image and sound, originating from the information terminal as any of various applications is executed at the information terminal, to be output from the information terminal to the onboard device and ultimately allow the image and sound to be output at the onboard device. For instance, in a system disclosed in patent literature 1 (Japanese Laid Open Patent Publication No. 2012-10287) functional information to be used to identify a specific function of an apparatus installed in a vehicle is held in a wireless IC tag or the like, and an information terminal, after reading the functional information, automatically starts up the corresponding application program.

In the system disclosed in patent literature 1, the application program corresponding to the functional information, having been started up at the information terminal, exchanges information with the partner on board apparatus. This means that a specific data format, a specific protocol and the like for the communication between the information terminal and the onboard device must be set in advance in correspondence to each application. However, the various applications may have been developed by different manufacturers and, furthermore, the manufacturer of an application program may be different from the manufacturer of the onboard device. For this reason, the quality of communication carried out between the information terminal and the onboard device may be different from one application to another and, in some cases, it may be difficult to carry out normal communication. In addition, an existing application will have to be modified so as to add a communication function enabling communication between the information terminal and the onboard device if it is to be used in the system.

SUMMARY OF THE INVENTION

The in-car information system according to a first aspect of the present invention includes a portable information terminal and an in-car device, wherein the information terminal includes: a storage unit in which applications are stored; and a control unit that executes an application manager having a launch function that enables execution of the application stored in the storage unit in a foreground and a communication function that enables execution of communication processing in a background to allow the information terminal and the in-car device to exchange information.

According to a second aspect of the present invention, in the in-car information system of the first aspect, it is preferred that: the application manager includes a first sub-application having the launch function and a second sub-application having the communication function; and the control unit executes the first sub-application in the foreground and executes the second sub-application in the background.

According to a third aspect of the present invention, in the in-car information system of the second aspect, the information terminal may further include an image output unit that outputs an image corresponding to the application being executed in the foreground by the control unit to the in-car device, and the in-car device may further include a display unit that displays the image output from the information terminal, an operation input unit via which an operation performed by a user is input, and an operation information transmission unit that transmits operation information corresponding to the operation input via the operation input unit to the information terminal.

According to a fourth aspect of the present invention, in the in-car information system of the third aspect, the first sub-application may also have a regulatory information acquisition function that enables the control unit to obtain regulatory information indicating details of operational restrictions to be imposed on each application while a vehicle is in a traveling state, and the second sub-application may also have an operational restriction function that enables the control unit to determine the details of the operational restrictions to be imposed while the vehicle is in a traveling state for the application currently being executed in the foreground by referencing the regulatory information. In this in-car information system, it is preferred that the control unit: obtains the regulatory information by using the regulatory information acquisition function; calls up an application other than the application manager, among the applications stored in the storage unit and executes the application instead of the first sub-application in the foreground by using the launch function; references the obtained regulatory information to determine the details of the operational restrictions to be imposed on the application while the vehicle is in a traveling state by using the operational restriction function; and transmits restriction information corresponding to the details of the operational restrictions to the in-car device by using the communication function. In addition, it is preferred that the in-car device either allows or disallows display of the image at the display unit and transmission of the operation information via the operation information transmission unit based upon the restriction information transmitted by the control unit from the information terminal.

According to a fifth aspect of the present invention, in the in-car information system of the third or fourth aspect, it is preferred that: the control unit draws a menu screen that will allow the user to select an application to be executed in the foreground in place of the first sub-application by using the launch function; the image output unit outputs the menu screen to the in-car device; the display unit displays the menu screen output from the image output unit; and the operation information transmission unit transmits operation information that corresponds to an application selected by the user via the operation input unit in the menu screen brought up on display at the display unit to the information terminal. And it is preferred that the control unit receives the operation information transmitted by the operation information transmission unit by using the communication function, and calls up the application selected by the user in the menu screen, based upon the operation information having been received, and executes the application in the foreground in place of the first sub-application by using the launch function.

According to a sixth aspect of the present invention, in the in-car information system of the fifth aspect, the applications may be sorted in advance into a group of approved applications, which are allowed to run in coordination with the in-car device, and a group of unapproved applications other than the approved applications. In this in-car information system, it is preferred that the control unit draws icons representing the approved applications and icons representing the unapproved applications in the menu screen by adopting different display modes so as to ensure that one group of icons is visually distinct from another group of icons.

According to a seventh aspect of the present invention, in the in-car information system of the sixth aspect, an operating system that is used to control operations of the control unit may also be stored in the storage unit. In this in-car information system, it is preferred that the control unit: draws a first menu screen that is used for the user to select, on a screen at the information terminal, an application to be executed in the foreground, by using the operating system when the information terminal is not connected to the in-car device; draws a second menu screen that is used for the user to select, on a screen either at the in-car device or at the information terminal, an application to be executed in the foreground, by using the launch function when the information terminal is connected to the in-car device; adopts identical display modes in the first menu screen and in the second menu screen for the icons representing the approved applications; and adopts different display modes in the first menu screen and in the second menu screen for the icons representing the unapproved applications.

According to an eighth aspect of the present invention, in the in-car information system of the seventh aspect, it is preferred that the control unit: arranges the icons representing the approved applications and the icons representing the unapproved applications intermingledly with a predesignated positional arrangement in the first menu screen; and arranges a group of the icons representing the approved applications and a group of the icons representing the unapproved applications separately from each other in the second menu screen.

According to a ninth aspect of the present invention, in the in-car information system of any one of the first through eighth aspects, the control unit may receive traveling information indicating a traveling condition of a vehicle from the in-car device by using the communication function and change an image drawn by the application being executed in the foreground in correspondence to the vehicle traveling condition ascertained based upon the traveling information having been received.

The in-car information system according to a tenth aspect of the present invention includes a portable information terminal and an in-car device, wherein the information terminal includes: a storage unit in which a plurality of applications are stored; a control unit that draws a menu screen that is used for a user to select an application to be executed among the plurality of applications stored in the storage unit, and executes the application selected in the menu screen; and an image output unit that outputs an image of the menu screen, having been drawn by the control unit, to the in-car device; and the in-car device includes a display unit that displays the image of the menu screen output from the information terminal. In this in-car information system, it is preferred that: the plurality of applications are sorted in advance into a group of approved applications, which are allowed to run in coordination with the in-car device, and a group of unapproved applications other than the approved applications; and the control unit arranges a group of icons representing the approved applications and a group of icons representing the unapproved applications separately from each other in the menu screen.

The information terminal according to an eleventh aspect of the present invention includes: a storage unit in which applications are stored; and a control unit that executes an application manager having a launch function that enables execution in a foreground of the application stored in the storage unit and a communication function that enables execution in a background of communication processing to allow the information terminal and the in-car device to exchange information.

The information terminal according to a twelfth aspect of the present invention includes: a storage unit in which a plurality of applications are stored; a control unit that draws a menu screen that is used for a user to select an application to be executed among the plurality of applications stored in the storage unit, and executes the application selected in the menu screen; and an image output unit that outputs an image of the menu screen, having been drawn by the control unit, to the in-car device. In this information terminal, it is preferred that: the plurality of applications are sorted in advance into a group of approved applications, which are allowed to run in coordination with the in-car device, and a group of unapproved applications other than the approved application; and the control unit arranges a group of icons representing the approved applications and a group of icons representing the unapproved applications separately from each other in the menu screen.

The application execution method according to a thirteenth aspect of the present invention is adopted in an in-car information system including a portable information terminal and an in-car device and includes: storing an application in advance in the information terminal; and executing by the information terminal an application manager having a launch function that enables execution of the application in a foreground and a communication function that enables execution of communication processing in a background to allow the information terminal and the in-car device to exchange information, so that the application is executed at the information terminal by using the launch function and information corresponding to the application is exchanged between the information terminal and the in-car device by using the communication function.

The application execution method according to a fourteenth aspect of the present invention is adopted in an in-car information system including a portable information terminal and an in-car device and includes: storing a plurality of applications that are sorted in advance into a group of approved applications, which are allowed to run in coordination with the in-car device, and a group of unapproved applications other than the approved applications, in advance in the information terminal; drawing by the information terminal a menu screen that is used for a user to select an application to be executed among the plurality of applications by arranging a group of icons representing the approved applications and a group of icons representing the unapproved applications separately from each other to output an image of the menu screen to the in-car device; displaying by the in-car device the image of the menu screen output from the information terminal; and executing by the information terminal the application selected in the menu screen.

The computer-readable program product according to a fifteenth aspect of the present invention includes a program that can be executed at a portable information terminal connected to an in-car device and including a control unit and a memory unit in which an application is stored in advance. In this program product, the program engages the control unit in execution of an application manager having a launch function that enables execution of the application in a foreground and a communication function that enables execution of communication processing in a background so as to allow the control unit to execute the application by using the launch function, and the information terminal and the in-car device to exchange information corresponding to the application by using the communication function.

The computer-readable program product according to a sixteenth aspect of the present invention includes a program that can be executed at a portable information terminal connected to an in-car device and including a control unit and a memory unit in which a plurality of applications, sorted in advance into a group of approved applications, which are allowed to run in coordination with the in-car device, and a group of unapproved applications other than the approved applications, are stored in advance. In this program product, the program engages the control unit to draw a menu screen that is used for a user to select an application to be executed among the plurality of applications by arranging a group of icons representing the approved applications and a group of icons representing the unapproved applications separately from each other in the menu screen.

According to the present invention, applications can be executed at a portable information terminal through coordinated operations at the information terminal and an in-car device by assuring consistency in the quality of communication between the information terminal and the in-car device. In addition, an existing application can be used without modification.

BRIEF DESCRIPTION OF THE DRAWINGS

FIG. 5 presents a flowchart of the processing executed to impose operational restrictions on a given application while the vehicle is in a traveling state.

DESCRIPTION OF PREFERRED EMBODIMENT

Figure 1:
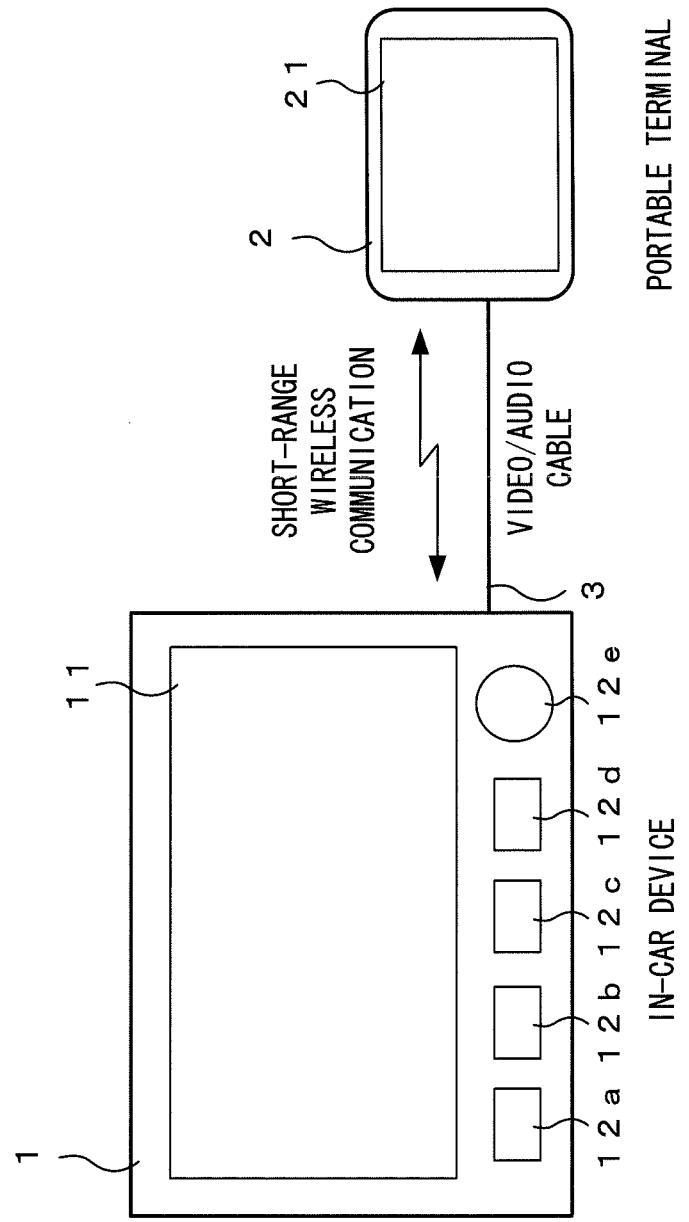
FIG. 1 shows the configuration of the in-car information system achieved in an embodiment of the present invention.

FIG. 1 shows the configuration of the in-car information system achieved in an embodiment of the present invention. The in-car information system in FIG. 1, which is used as an onboard system installed in a vehicle, is configured by connecting an in-car device 1 with a portable terminal 2 through short-range wireless communication and through wired communication enabled via a video/audio cable 3. The in-car device 1 is installed at a fixed position within the vehicle, at, for instance, the instrument panel in the vehicle. The portable terminal 2 is a portable information terminal that can be carried by the user, such as a portable telephone or a smart phone. It is to be noted that short-range wireless communication may be carried out between the in-car device 1 and the portable terminal 2 in compliance with, for instance, the Bluetooth standard. In addition, the wired communication achieved via the video/audio cable 3 may be in compliance with, for instance, the HDMI (high definition multimedia interface) standard.

A display unit 11 and operation keys (operation switches) 12a, 12b, 12c, 12d and 12e are disposed at the in-car device 1. The display unit 11 is a display monitor at which various types of still images and video can be displayed, and may be constituted with, for instance, a liquid crystal display unit. The operation keys 12a through 12e are operation switches via which user input operations are detected and are assigned with various functions in correspondence to the processing currently underway in the in-car device 1. The user operates a specific operation key among the operation keys 12a through 12e to engage the in-car device 1 in execution of a desired function. It is to be noted that while the example presented in FIG. 1 includes the operation keys 12a through 12d constituted as pushbutton-type switches and the operation key 12e constituted as a dial-type switch that can be rotated to the left and to the right, the present invention is not limited to this example and may be adopted in conjunction with operation keys disposed with a different positional arrangement, operation keys adopting different structures, operation keys provided in a different quantity or the like. In addition, the display unit 11 may be constituted as a touch panel-type display monitor and such a display unit 11 may include only some of the operation keys or it may dispense with all the operation keys.

A display unit 21 is disposed at the portable terminal 2. The display unit 21 is a touch panel-type display monitor at which various types of still images and video can be displayed and it may be configured by combining, for instance, a touch sensor capable of detecting a position at which it has been touched and a liquid crystal display unit. The user is able to issue an instruction for the portable terminal 2 to execute a desired function by touching a given position on the display unit 21 with his finger or the like, in correspondence to the content of an image or video on display at the display unit 21. It is to be noted that while the display unit 21 in this example is constituted with a touch panel-type display monitor, the present invention may be adopted in conjunction with a standard display monitor instead of a touch panel-type display monitor. In such a case, it is desirable that the portable terminal 2 include various types of operation switches corresponding to specific details of processing executed by the portable terminal 2. As an alternative, the present invention may be adopted in conjunction with a display unit 21 constituted with a touch panel-type display monitor in an portable terminal 2 that also includes operation switches, each corresponding to a specific operation.

Figure 2:
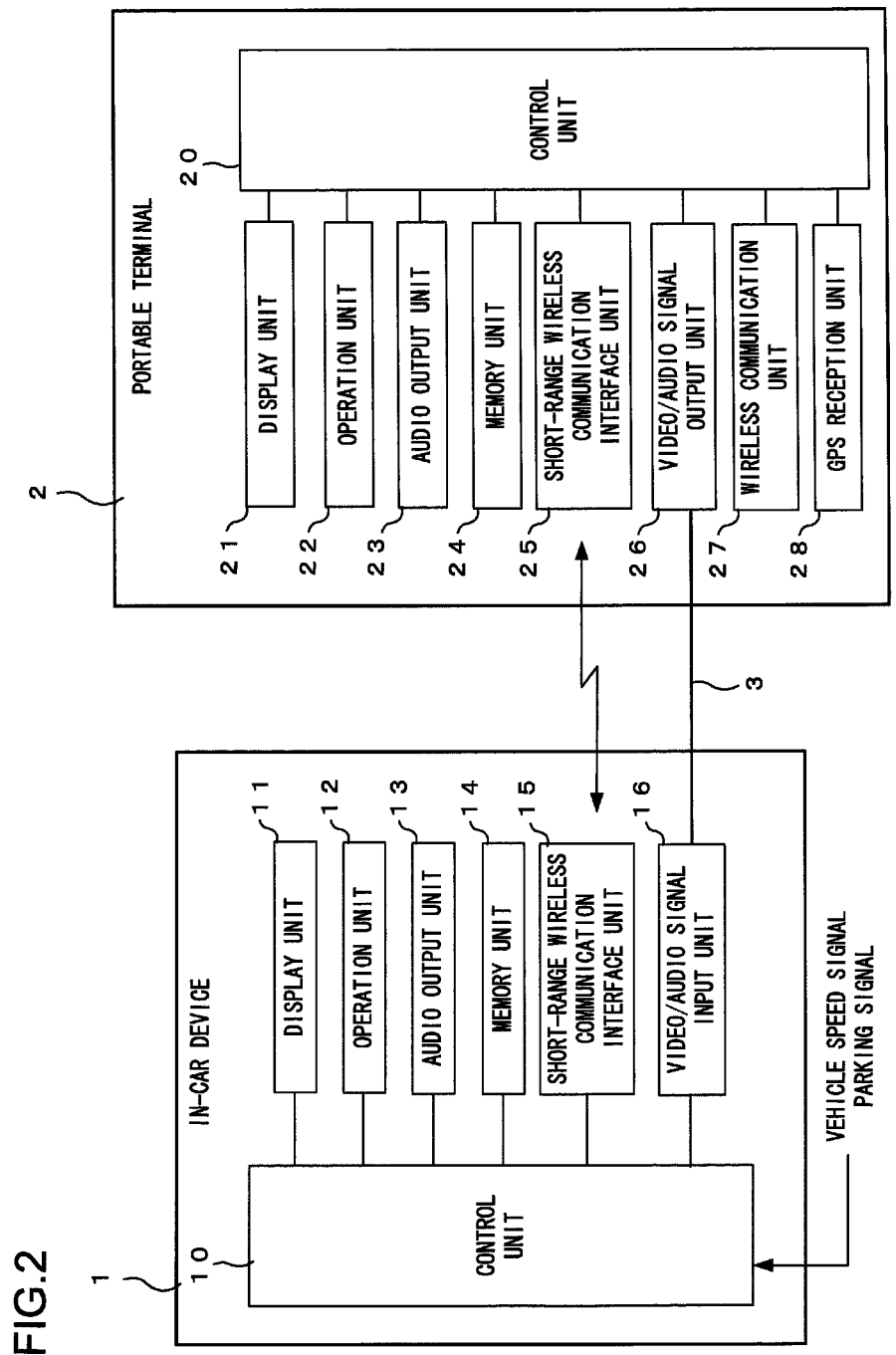
FIG. 2 is a block diagram showing the structures adopted in the in-car device and the portable terminal.

FIG. 2 is a block diagram showing the structures of the in-car device 1 and the portable terminal 2. As shown in FIG. 2, the in-car device 1 includes a control unit 10, the display unit 11, an operation unit 12, an audio output unit 13, a memory unit 14, a short-range wireless communication interface unit 15 and a video/audio signal input unit 16. The portable terminal 2 includes a control unit 20, the display unit 21, an operation unit 22, an audio output unit 23, a memory unit 24, a short-range wireless communication interface unit 25, a video/audio signal output unit 26, a wireless communication unit 27 and a GPS (global positioning system) reception unit 28.

The control unit 10 in the in-car device 1, which is constituted with a microprocessor, various peripheral circuits, a RAM, a ROM and the like, executes various types of processing based upon a control program recorded in the memory unit 14. Various types of image display processing, audio output processing and the like are enabled through processing executed by the control unit 10.

In addition, the control unit 10 obtains a vehicle speed signal and a parking signal output from the vehicle. The control unit 10 determines whether the vehicle is currently in a traveling state or in a stationary state based upon the vehicle speed signal and the parking signal. It is to be noted that the vehicle speed signal and the parking signal may be provided from the vehicle to the control unit 10 in the form of a vehicle speed pulse output via a CAN (controller area network) configuring an onboard communication network, from a vehicle speed sensor installed in the vehicle.

As has been explained in reference to FIG. 1, the display unit 11 is a display monitor constituted with a liquid crystal display unit or the like. The operation unit 12 is a switch via which a user input operation is detected and it may be configured with, for instance, the operation keys 12*a* through 12*e* shown in FIG. 1. It is to be noted that the display unit 11 may instead be constituted as a touch panel-type display monitor, as explained earlier, and in such a case, the display unit 11 and the operation unit 12 may be integrated into a single structural element. The details of an input operation performed by the user at the operation unit 12 are output to the control unit 10 and are reflected in the processing executed by the control unit 10.

The audio output unit 13, which includes an amplifier, a speaker and the like, is capable of outputting various types of sound under control executed by the control unit 10. For instance, music played back by reproducing music data read out from the portable terminal 2 or a recording medium (not shown), audio guidance used to guide the vehicle to a destination, or the like can be output from the audio output unit 13.

The memory unit 14, which is a non-volatile data storage device, may be constituted with an HDD (hard disk drive), a flash memory or the like. Various types of data, including the control program used by the control unit 10, as explained earlier, are stored in the memory unit 14. Data are read out from the memory unit 14 and written into the memory unit 14 as needed under control executed by the control unit 10.

The short-range wireless communication interface unit 15 executes, under control executed by the control unit 10, wireless interface processing required to enable short-range wireless communication with the portable terminal 2. For instance, it converts information output from the control unit 10 to a wireless signal in a predetermined signal format and transmits the wireless signal to the portable terminal 2. It also receives information output from the portable terminal 2 as a wireless signal in a predetermined signal format and outputs the received wireless signal information to the control unit 10. The short-range wireless communication interface unit 15 executes such interface processing in compliance with a specific communication standard such as Bluetooth.

The video/audio signal input unit 16 converts a video signal and an audio signal input from the portable terminal 2 via the video/audio cable 3 to video data for screen display and audio data for audio output respectively and outputs the video data and the audio data to the control unit 10. The control unit 10, having obtained the video data and the audio data output from the video/audio signal input unit 16, controls the display unit 11 so as to bring up on display at the display unit 11 a screen based upon the video data and also enables the audio output unit 13 to output sound based upon the audio data by controlling the audio output unit 13.

The control unit 20 in the portable terminal 2 is constituted with a microprocessor, various peripheral circuits, a RAM, a ROM and the like, as is the control unit 10 in the in-car device 1, and executes various types of processing based upon a control program recorded in the memory unit 24.

As explained earlier, the display unit 21 is a touch panel-type display monitor. The operation unit 22 is used for purposes of user input operation detection. It is to be noted that while the display unit 21 and the operation unit 22 are shown as separate structural elements in FIG. 2, the operation unit 22 is, in fact, constituted as an integrated part of the touch panel-type display unit 21. In the alternative configuration described earlier, which includes operation switches disposed at the portable terminal 2, the operation switches correspond to the operation unit 22. Details of a user input operation performed at the operation unit 22 are output to the control unit 20 and are reflected in the processing executed by the control unit 20.

The audio output unit 23, which includes an amplifier, a speaker and the like, is capable of outputting various types of sound under control executed by the control unit 20. During a phone conversation carried out via the portable terminal 2, for instance, the voice of the other party is output from the audio output unit 23.

In the memory unit 24, which is a non-volatile data storage device similar to the memory unit 14 in the in-car device 1, various types of data to be used in the processing executed by the control unit 20 are stored. Various application programs (hereafter simply referred to as applications), acquired by the user in advance, are also stored in the memory unit 24. The user is able to select a specific application among the various applications stored in the memory unit 24 and have it executed by the control unit 20. In this manner, various functions can be fulfilled in the portable terminal 2.

As does the short-range wireless communication interface unit 15 in the in-car device 1, the short-range wireless communication interface unit 25 executes wireless interface processing in compliance with the predetermined communication standard. Namely, information communication between the in-car device 1 and the portable terminal 2 is achieved as the short-range wireless communication interface unit 15 and the short-range wireless communication interface unit 25 exchange information with each other through wireless communication.

The video/audio signal output unit 26 converts an image (video image) and sound generated by the control unit 20 to a video signal and an audio signal in compliance with a predetermined communication standard such as HDMI and outputs the signals resulting from the conversion to the in-card device 1 via the video/audio cable 3. As the video signal and the audio signal are input at the video/audio signal input unit 16 in the in-car device 1, a screen identical to that brought up on display at the display unit 21 in the portable terminal 2 is brought up on display at the display unit 11 in the in-car device 1 and sound identical to that output from the audio output unit 23 in the portable terminal 2 is also output from the audio output unit 13 in the in-car device 1. The term "video mirroring" is often used to refer to this function.

The portable terminal 2 performs wireless communication to connect with another portable terminal or a server via a wireless communication network (not shown). Through the wireless communication carried out via the wireless communication unit 27, the portable terminal 2 is able to perform a telephone conversation with another portable terminal, download a desired application from a server, and the like. It is to be noted that the wireless communication network enabling wireless communication carried out via the wireless communication unit 27 may be, for instance, a portable telephone network or the Internet, connection with which can be established via a wireless LAN.

The GPS reception unit 28 receives GPS signals transmitted from GPS satellites and outputs the GPS signals thus received to the control unit 20. Each GPS signal carries, as information that can be used to determine the current position of the portable terminal 2 and the current time, information indicating the position of the GPS satellite having transmitted the particular GPS signal and the transmission time point. Thus, the current position and the current time can be calculated in the control unit 20 based upon information carried in GPS signals received from a predetermined minimum number of GPS satellites.

Next, a coordinated function achieved by the in-car device 1 and the portable terminal 2 in this in-car information system will be described. A coordinated function achieved by the in-car device 1 and the portable terminal 2 is available in the in-car information system. When the coordinated function is in effect, an image and sound corresponding to a specific application among the various applications, executed at the portable terminal 2 connected with the in-car device 1 can also be displayed and output at the in-car device 1. In addition, details of a user operation performed at the in-car device 1 can be reflected in the operation of the application being executed at the portable terminal 2.

For instance, navigation processing may be executed so as to guide the vehicle to a destination by executing a navigation application at the portable terminal 2. In the navigation processing, a map screen with a map of an area around of the current position drawn therein is created at the portable terminal 2 and a video signal corresponding to the map screen is output to the video/audio signal input unit 16 from the video/audio signal output unit 26 via the video/audio cable 3. Through this processing, the map screen is transmitted from the portable terminal 2 to the in-car device 1 so as to bring up the map screen of the area around the current position at the display unit 11 in the in-car device 1. In addition, as the user sets a destination through a user operation performed at the operation unit 12 in the in-car device 1 or at the operation unit 22 in the portable terminal 2, a search for a recommended route from the current vehicle position designated as a departure point to the destination having been set is executed at the portable terminal 2. As the vehicle approaches a guidance requiring point on the recommended route, audio guidance data indicating the direction along which the vehicle is to advance at the particular guidance requiring point are transmitted from the portable terminal 2 to the in-car device 1. As a result, audio guidance can be output from the audio output unit 13 in the in-car device 1. It is to be noted that specific signals may be output from the portable terminal 2 to the in-car device 1, each in correspondence to the timing of the audio guidance data output start and the timing of the audio guidance data output end. Through these measures, it can be ensured that the user will be able to hear the audio guidance clearly, even if other audio data are being output via the radio, the CD player or the like in the in-car device 1, by lowering the sound volume for the other audio output during the audio guidance output. As described above, the in-car device 1 provides the user with guidance information so that the user is able to drive the vehicle to the destination without getting lost by displaying a map image at the display unit 11 and outputting audio guidance via the audio output unit 13.

It is to be noted that various types of data including map data needed by the portable terminal 2 when executing the navigation application may be stored in advance in the memory unit 24 in the portable terminal 2. As an alternative, only data that are absolutely necessary may be stored in the memory unit 24 and in such a case, the portable terminal 2 should be able to connect with a specific server via the wireless communication unit 27 in order to obtain necessary additional data each time it executes the navigation application.

At the portable terminal 2, an application selected by the user, among the plurality of applications including a navigation application such as that described above, is executed. The user is able to select a desired application he wishes to have executed at the portable terminal 2 by operating the operation unit 22 in a menu screen on display at the display unit 21 in the portable terminal 2.

In addition, the portable terminal 2 transmits a menu screen in the form of a video signal provided from the video/audio signal output unit 26, to the in-car device 1. Based upon the video signal transmitted from the portable terminal 2, the in-car device 1 brings up the menu screen on display at the display unit 11. As the user operates the operation unit 12 so as to select a desired application in this menu screen, operation information corresponding to the operational details of the user operation is transmitted via the short-range wireless communication interface unit 15 from the in-car device 1 to the portable terminal 2. It is to be noted that the operation information output from the in-car device 1 may be, for instance, button information indicating details of a button operation performed by the user or coordinate information indicating the position on the screen at the display unit 11 specified through a touch panel operation.

The operation information transmitted from the in-car device 1 as described above is received at the short-range wireless communication interface unit 25 in the portable terminal 2 and the operation information thus received is then output to the control unit 20. Based upon the operation information received as described above, the control unit 20 identifies the application selected by the user at the in-car device 1 and executes the selected application. Through this process, the user is able to select a desired application in the menu screen on display at the in-car device 1, just as he is able to select a desired application in the menu screen brought up on display at the display unit 21 at the portable terminal 2, and have the selected application executed in the portable terminal 2.

It is to be noted that the control unit 20 is able to execute each application either in the foreground or in the background. Any application being executed in the foreground is designated as a subject application for image display and operation input both at the in-car device 1 and at the portable terminal 2. While the control unit 20 does execute the corresponding processing for an application running in the background, the application is not a subject application for image display or operation input at the in-car device 1 or the portable terminal 2. However, sound originating from the application being executed in the background may be output.

In order to enable a coordinated function such as that described above achieved by connecting the in-car device 1 to the portable terminal 2, an application referred to as an application manager is installed in advance and stored in the memory unit 24 at the portable terminal 2. Namely, a plurality of applications including the application manager is stored in the memory unit 24. As the portable terminal 2 becomes connected to the in-car device 1, the application manager is read out from the memory unit 24 and is executed by the control unit 20.

Figure 3:
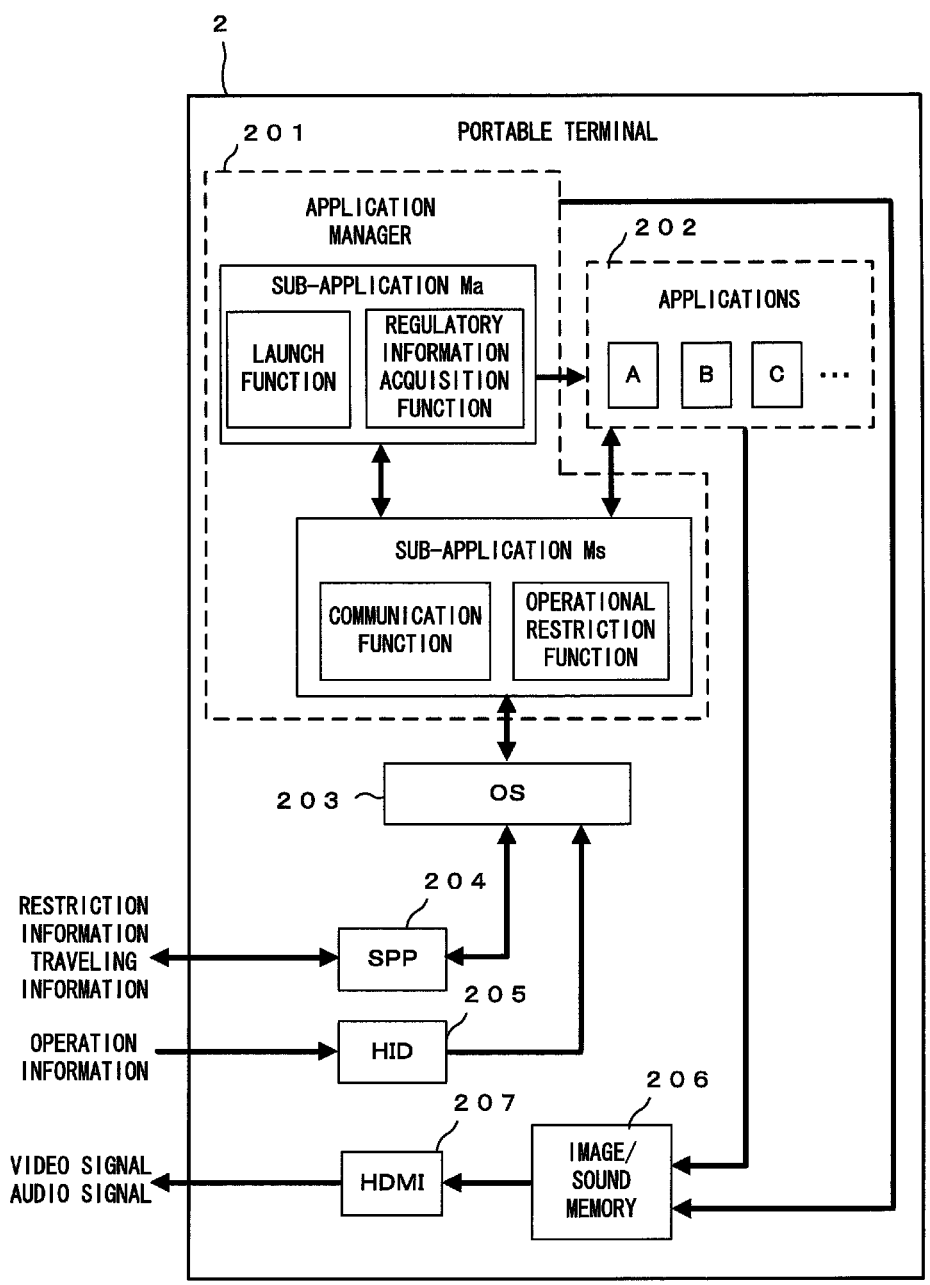
FIG. 3 is a schematic diagram illustrating the software structure adopted in the portable terminal.

FIG. 3 is a diagram schematically illustrating the software structure adopted in the portable terminal 2. An application manager 201 in FIG. 3 includes a sub-application Ma and a sub-application Ms.

The sub-application Ma has a launch function for starting up applications other than the application manager 201 itself and a regulatory information acquisition function for obtaining regulatory information for each application. The control unit 20 is able to use these functions by executing the sub-application Ma in the foreground. For instance, the launch function is used to call up another application and have that application executed in the foreground by the control unit 20, instead of the sub-application Ma. In addition, the regulatory information acquisition function is used to obtain the regulatory information indicating details of operational restrictions to be imposed on each application among the plurality of applications stored in the memory unit 24 while the vehicle is in a traveling state from the memory unit 24, an external server or the like.

The sub-application Ms has a communication function to be engaged when connecting the portable terminal 2 to the in-car device 1 and an operational restriction function for imposing operational restrictions while the vehicle is in the traveling state. The control unit 20 is able to use these functions by executing the sub-application Ms in the background. For instance, the communication function enables execution of communication processing so as to allow the information terminal 2 and the in-car device 1 to exchange information needed for coordinated operations. In addition, the operational restriction function is used to determine the details of the operational restrictions to be imposed on the application being executed in the foreground while the vehicle is in a traveling state by referencing the regulatory information obtained through the regulatory information acquisition function of the sub-application Ma described earlier. Restriction information indicating the determination results is transmitted from the portable terminal 2 to the in-car device 1 through the communication function and is utilized in the in-car device 1 when imposing operational restrictions while the vehicle is in a traveling state.

As explained above, the application manager 201 is configured with two separate sub-applications, i.e., the sub-application Ma executed by the control unit 20 in the foreground and the sub-application Ms executed by the control unit 20 in the background. By adopting this structure, optimization of function assignments within the application manager 201 is achieved so as to assign functions best suited for foreground execution as foreground functions and assign functions best suited for background execution as background functions.

The application manager 201 calls up a given application among various applications 202 through the launch function of the sub-application Ma. The application thus called up is them executed by the control unit 20 in the foreground instead of the sub-application Ma. It is to be noted that the following description will be given in reference to FIG. 3 by assuming that application A is being executed.

An OS (operating system) 203 is a software program used to manage the overall operations of the portable terminal 2. When the portable terminal 2 is connected to the in-car device 1, the OS 203 acts as a go-between for information output from the sub-application Ms executed by the control unit 20 in the background and input to an SPP profile 204 and an HID profile 205 and vice versa. The SPP profile 204 and the HID profile 205 are drivers used in short-range wireless communication carried out between the in-car device 1 and the portable terminal 2. These drivers are standardized as part of the standard used in compliance with Bluetooth.

The SPP profile 204 executes processing for transmitting the restriction information indicating the results of the determination made with regard to the operational restriction details through the operational restriction function of the sub-application Ms, and processing for receiving traveling information transmitted from the in-car device 1 based upon the vehicle traveling state. The HID profile 205 executes processing for receiving operation information output in correspondence to details of the user operation performed at the in-car device 1. The contents of the various types of information received by the SPP profile 204 and the HID profile 205 are output to the sub-application Ms via the OS 203 and are then transferred to the application, the execution of which is underway, through the communication function of the sub-application Ms. It is to be noted that the transmission/reception of the various types of information is enabled through wireless communication carried out by the short-range wireless communication interface unit 15 at the in-car device 1 and the short-range wireless communication interface unit 25 at the portable terminal 2.

The sub-application Ma currently executed in the foreground by the control unit 20 engages the launch function explained earlier so as to generate a menu screen image that will allow the user to select an application he wishes to have executed. If, on the other hand, application A is currently being executed in the foreground by the control unit 20, the application A generates a specific image and sound by utilizing, as needed, the traveling information or the operation information transferred from the sub-application Ms. The image and the sound are then stored into a sound-image memory 206 on a temporary basis, before they are output to an HDMI driver 207.

The HDMI driver 207 executes processing for converting an image and sound generated by the sub-application Ma, application A or the like to a video signal and an audio signal through a method in compliance with the HDMI standard. The video signal and the audio signal resulting from the conversion are then output by the video/audio signal output unit 26 to in-car device 1 via the video/audio cable 3.

The portable terminal 2 has a software structure as described above. It is to be noted that the software structure may be achieved by using, for instance, the Android operating system. In the software configured in the Android operating system, the sub-application Ma will be executed in the "Activity" thread and the sub-application Ma will be executed in the "Service" thread so as to enable execution of the sub-application Ma in the foreground by the control unit 20 concurrently with the sub-application Ms, being executed in the background.

Next, operational restrictions that may be imposed on an application while the vehicle is in a traveling state will be described. The applications that can be executed at the portable terminal 2 include applications that might distract the driver and thus compromise driving safety if image display or user operation input at the in-car device 1, enabled through a coordinated function such as that described earlier, was allowed while the vehicle was in a traveling state. Accordingly, it is desirable that even if such an application is executed at the portable terminal 2 while the vehicle is traveling, restrictions be imposed on the display of an image at the in-car device 1 or a user operation input at the in-car device 1. Accordingly, restrictions are imposed on certain application operations while the vehicle is in a traveling state and the portable terminal 2 through the method described below.

Figure 4:
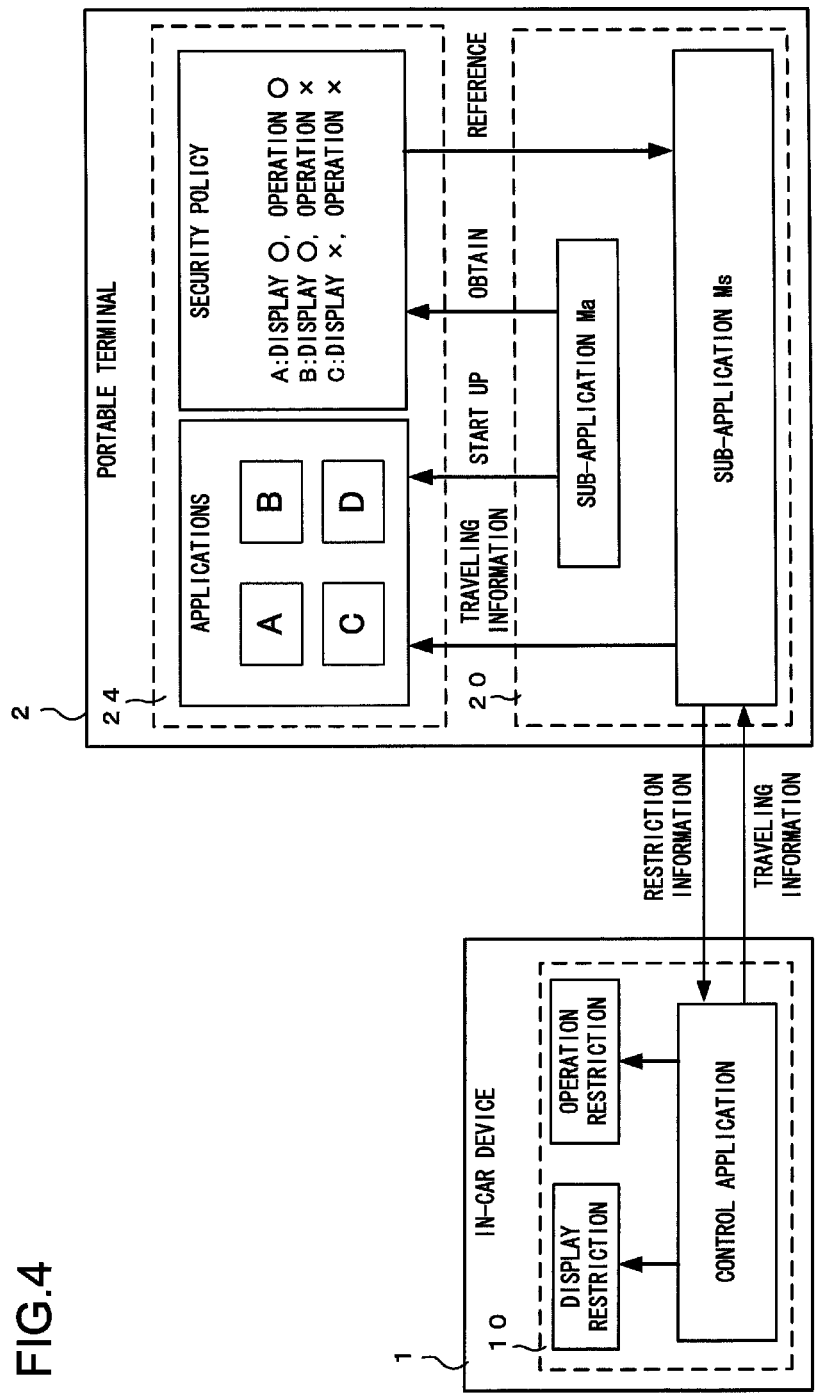
FIG. 4 is a conceptual diagram illustrating how operational restrictions may be imposed on applications while the vehicle is in a traveling state.

FIG. 4 is a conceptual diagram illustrating how operational restrictions are imposed on applications while the vehicle is traveling. The following description of operational restrictions imposed on a given application while the vehicle is traveling will be given by assuming that four different types of preinstalled applications A, B, C and D, are stored in the memory unit 24 at the portable terminal 2, as illustrated in FIG. 4, and that one of these applications is selected and executed in response to a user operation.

As a connection between the in-car device 1 and the portable terminal 2 is established, the control unit 20 starts up the sub-application Ma and executes it in the foreground. It then obtains the regulatory information indicating the details of the operational restrictions to be imposed in correspondence to each application while the vehicle is in a traveling state from a specific source, such as a server connected via a wireless communication network, by using the regulatory information acquisition function of the sub-application Ma. The regulatory information thus obtained is stored into the memory unit 24.

The following description will be given by assuming that a security policy such as that shown in FIG. 4 has been obtained as the regulatory information. The security policy in the example allows both image display and user operation input in correspondence to application A, allows image display but disallows user operation input in correspondence to application B and disallows both image display and user operation input in correspondence to application C. It is to be noted that no regulatory information is recorded in the security policy for application D in the example presented in FIG. 4.

As one of the applications A through D is selected at the portable terminal 2 in response to a user operation, the control unit 20 reads out the selected application from the memory unit 24 and starts it up by using the launch function of the sub-application Ma. Then, it starts executing the application in the foreground in place of the sub-application Ma, which has been running in the foreground.

Once one of the applications A through D is started up as described above, the control unit 20 identifies the application having been started up by using the operational restriction function of the sub-application Ms, which is executed at all times in the background. Then, it references the security policy stored in the memory unit 24 so as to determine the details of the operational restrictions to be imposed on the particular application while the vehicle is in a traveling state.

For instance, if application A is currently being executed, the control unit 20 determines the details of the operational restrictions to be imposed on application A while the vehicle is in a traveling state by referencing the part of the security policy corresponding to application A. Namely, it determines that both image display and user operation input are both allowed in correspondence to application A even while the vehicle is in a traveling state.

If, on the other hand, application B is currently being executed, the control unit 20 determines the details of the operational restrictions to be imposed on application B while the vehicle is in a traveling state by referencing the part of the security policy corresponding to application B. Namely, it determines that the image display is allowed but user operation input is disallowed in correspondence to application B while the vehicle is in a traveling state.

In addition, if application C is currently being executed, the control unit 20 determines the details of the operational restrictions to be imposed on application C while the vehicle is in a traveling state by referencing the part of the security policy corresponding to application C. Namely, it determines that both image display and user operation input are disallowed in correspondence to application C while the vehicle is in a traveling state.

It is to be noted that if application D is currently being executed in the control unit 20, no regulatory information can be referenced since the security policy does not include any part corresponding to application D. Under such circumstances, it is desirable to determine that both the image display and the user operation input are to be disallowed, as in the case of application C. Through these measures, even when an application not covered by the security policy is being executed, driver distraction will be prevented and safe driving will be assured.

Upon determining the details of the operational restrictions to be imposed while the vehicle is in a traveling state in correspondence to the application currently being executed, as described above, the control unit 20 transmits the restriction information corresponding to the determination results to the in-car device 1 by using the communication function of the sub-application Ms. The restriction information is transmitted via the short-range wireless communication interface unit 25.

At the in-car device 1, the restriction information having been transmitted from the portable terminal 2 is received via the short-range wireless communication interface unit 15, by a control application being executed in the control unit 10. Then, based upon the restriction information having been received, the details of the operational restrictions to be imposed while the vehicle is in a traveling state for the application being executed at the portable terminal 2 are determined and if the vehicle is currently in a traveling state, a display restriction or an operation restriction is imposed in correspondence to the details of the operational restrictions.

For instance, if application A is currently being executed at the portable terminal 2, the display of an image originating from the portable terminal 2 and user operation input are both allowed even while the vehicle is in a traveling state, without imposing any display or operation restriction. Namely, the image corresponding to the application A originating from the portable terminal 2 is output to the display unit 11 and is thus brought up on display at the display unit 11, and the operation information corresponding to the user operation input performed at the operation unit 12 is transmitted from the short-range wireless communication interface unit 15.

If, on the other hand, application B is currently being executed at the portable terminal 2, the display of an image originating from the portable terminal 2 is allowed but user operation input is disallowed while the vehicle is in a traveling state by simply imposing the operation restriction alone. Namely, the image corresponding to application B originating from the portable terminal 2 is output to the display unit 11 and is thus brought up on display at the display unit 11, but transmission of the operation information via the short-range wireless communication interface unit 15 is disallowed.

In addition, if application C or application D is currently being executed at the portable terminal 2, the display of an image originating from the portable terminal 2 and user operation input are both disallowed while the vehicle is in a traveling state by imposing both the display restriction and the operation restriction. Namely, the image display at the display unit 11 is disallowed and the transmission of the operation information via the short-range wireless communication interface unit 15 is also disallowed.

In addition, the control application being executed by the control unit 10 at the in-car device 1 determines, based upon the vehicle speed signal and the parking signal output from the vehicle, whether the vehicle is currently in a traveling state or in a stationary state. It detects any change in the vehicle traveling condition indicated in the determination results and outputs traveling information indicating the new traveling condition to the portable terminal 2. The traveling information is transmitted via the short-range wireless communication interface unit 15.

At the portable terminal 2, the traveling information having been transmitted from the in-car device 1 is received via the short-range wireless communication interface unit 25 by using the communication function of the sub-application Ms being executed by the control unit 20. The traveling information thus received is then transferred to the application currently running in the foreground. Based upon the traveling information, the application determines the traveling condition of the vehicle and executes processing corresponding to the traveling condition as necessary. For instance, when the vehicle is in a traveling state, it may draw an image different from the image drawn in a stationary state. In addition, it may restrict the use of some functions with the vehicle in a traveling state. By doing this, the operational restriction when the vehicle is traveling is imposed in the portable terminal 2. It is to be noted that the details of the operational restrictions imposed for each application are defined in advance for the particular application.

FIG. 5 presents a flowchart of the processing executed at the in-car device 1 and at the portable terminal 2 in order to impose operational restrictions on a specific application while the vehicle is in a traveling state.

After the sub-application Ma is started up by the control unit 20 at the portable terminal 2, the sub-application Ma obtains, through its regulatory information acquisition function, the security policy from a predetermined source in step 40. It then records the security policy into the memory unit 24.

Once the user selects a specific application at the portable terminal 2, the sub-application Ma detects, through its launch function, the identity of the selected application in step 41. Then, in step 42, the sub-application Ma outputs a startup command for the application to start it up. In response to the startup command, the application is started up in step 43 and the control unit 20 starts executing the application in the foreground in place of the sub-application Ma.

After the application is started up as described above, the sub-application Ms references the security policy obtained in step 40 through its operational restriction function, in step 44. Then, in step 45, it determines, based upon the content of the security policy, the details of the operational restrictions to be imposed in correspondence to the particular application while the vehicle is in a traveling state.

Once the details of the operational restrictions for the application having been started up are determined, the sub-application Ms transmits, through its communication function, restriction information corresponding to the operational restriction details, to the in-car device 1 in the following step 46. This restriction information is received by the control application being executed in the control unit 10 at the in-car device 1.

In step 47, the control application determines the details of the operational restrictions to be imposed on the application while the vehicle is in a traveling state, the execution of which is underway at the portable terminal 2, based upon the control information received in step 46. Then, if the vehicle is in a traveling state, the display restriction and/or the operation restriction is imposed in the following step 48 in correspondence to the details of the operational restrictions having been determined in step 47. It is to be noted that the processing in step 48 does not need to be executed if the vehicle is not in a traveling state.

In addition, in step 49, the control application detects any change in the vehicle traveling condition based upon the vehicle speed signal and the parking signal output from the vehicle. Upon detecting a change in the vehicle traveling condition, it outputs traveling information indicating the new traveling condition resulting from the change to the portable terminal 2 in step 50. This traveling information is received through the communication function of the sub-application Ms being executed in the background by the control unit 20 at the portable terminal 2.

In step 51, the sub-application Ms transfers the traveling information received in step 50 to the application currently being executed by the control unit 20.

In step 52, the application currently being executed by the control unit 20 determines, based upon the traveling information received in step 51, the vehicle traveling condition and executes processing corresponding to the traveling condition. For instance, it may alter the image it draws or restrict the use of some of its functions in correspondence to the traveling condition, so as to impose the operational restrictions, the details of which are set in advance for the particular application in correspondence to the vehicle traveling condition, as explained earlier.

It is to be noted that the processing in steps 48 through 52 in FIG. 5 explained above is repeatedly executed over predetermined processing cycles, as long as any application is being executed at the portable terminal 2. As a result, the operational restrictions imposed on the application being executed at the portable terminal 2 are sustained at both the in-car device 1 and the portable terminal 2, as long as the vehicle remains in a traveling state.

Next, menu screens brought up on display at the in-car device 1 and the portable terminal 2 will be explained. FIG. 6 presents examples of menu screens that may be brought up on display at the in-car device 1 and the portable terminal 2.

Figure 6A:
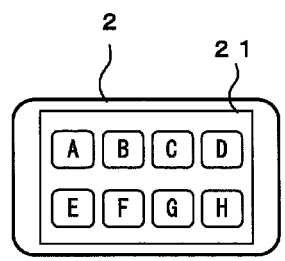
FIGS. 6A and 6B present examples of menu screens.

The menu screen in FIG. 6A represents an example of a menu screen that may be brought up on display at the portable terminal 2 when it is not connected with the in-car device 1. The control unit 20 draws a menu screen such as that shown in FIG. 6A and displays the menu screen at the display unit 21 through its OS 203 shown in FIG. 3. The menu screen includes eight icons each representing an application among applications "A" through "H". The positional arrangement with which these icons are set can be specified in advance by the user at the portable terminal 2.

Once the in-car device 1 and the portable terminal 2 become connected with each other and the sub-application Ma is started up, the control unit 20 draws a menu screen different from the menu screen shown in FIG. 6A by using the launch function of the sub-application Ma. This menu screen, which will allow the user to select an application to be executed in the foreground by the control unit 20 in place of the sub-application Ma so as to enable the in-car device 1 and the portable terminal 2 to realize a coordinated function as described earlier, is utilized at both the in-car device 1 and the portable terminal 2. In the following description, such a menu screen will be referred to as a coordinated menu screen.

The coordinated menu screen, having been drawn by the control unit 20 in the portable terminal 2, is brought up on display at the display unit 21 in the portable terminal 2. In addition, it is provided from the portable terminal 2 to the in-car device 1 as a video signal output from the video/audio signal output unit 26. At the in-car device 1, the video signal output from the portable terminal 2 is input to the video/audio signal input unit 16 and the coordinated menu screen, having been drawn at the portable terminal 2, is brought up on display at the display unit 11 by using the video signal. As a result, a coordinated menu screen such as that shown in FIG. 6B is brought up on display both at the display unit 11 in the in-car device 1 and at the display unit 21 in the portable terminal 2.

Figure 6B:
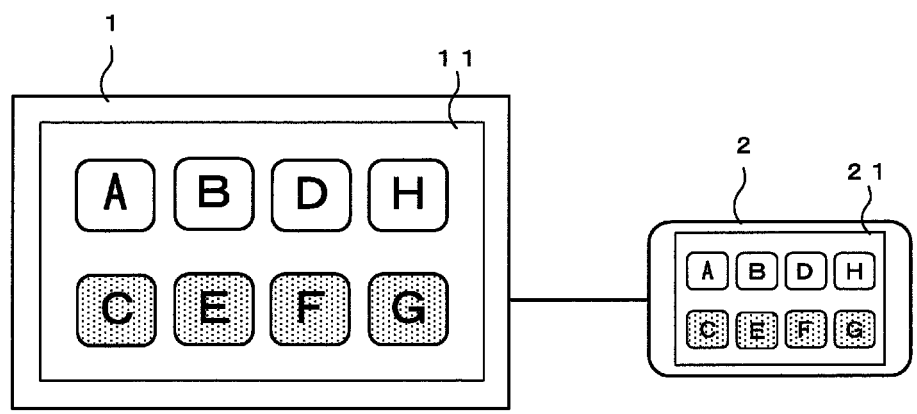

In the coordinated menu screen in FIG. 6B, four icons representing the application "A", the application "B", the application "D" and the application "H" are displayed on the upper side by adopting a display mode matching that of the menu screen shown in FIG. 6A. These applications are allowed in advance at the portable terminal 2 to coordinate with the in-car device 1. In the following description, such an application will be referred to as an approved application. In addition, the four icons representing applications other than the approved applications, i.e., the application "C", the application "E", the application "F" and the application "G", are displayed on the lower side in a display mode different from that assumed for the menu screen in FIG. 6A. In the following description, these applications that are not allowed to coordinate with the in-car device 1 will be referred to as unapproved applications.

As shown in FIG. 6A, the control unit 20 arranges the icons "A", "B", "D" and "H" representing the approved applications and the icons "C", "E", "F" and "G" representing the unapproved applications intermingledly with a predesignated positional arrangement in the menu screen brought up on display when the portable terminal 2 is not connected to the in-car device 1. On the other hand, in the coordinated menu screen brought up on display when the in-car device 1 and the portable terminal 2 are connected with each other, the control unit 20 arranges the group of icons "A", "B", "D" and "H" representing the approved applications and the group of icons "C", "E", "F" and "G" representing the unapproved applications separately from each other, as shown in FIG. 6B. In addition, the icons representing the approved applications are displayed in a display mode different from the display mode for the icons representing the unapproved applications, so as to make it possible to distinguish one group of icons from the other in the coordinated menu screen. Through these measures, the icons representing the approved applications are displayed in the coordinated menu screen in such a manner that the user is able to select them with ease.

It is to be noted that the sub-application Ma designates in advance each application as either an approved application or an unapproved application. Namely, each application stored in the memory unit 24 at the portable terminal 2 is sorted in advance into an approved application group or an unapproved application group.

As the user selects a given icon on the menu screen or the coordinated menu screen described above by performing an operation at the in-car device 1 or the portable terminal 2, the application represented by the particular icon is started up at the portable terminal 2.

For instance, as the user selects, via the operation unit 12, an icon in the coordinated menu screen in FIG. 6B brought up on display at the display unit 11 in the in-car device 1, operation information corresponding to the application represented by the icon is transmitted from the in-car device 1 to the portable terminal 2. The operation information transmitted to the portable terminal 2 at this time may be, for instance, coordinate information corresponding to the position of the selected icon. The control unit 20 at the portable terminal 2 receives the operation information transmitted from the in-car device 1 by using the communication function of the sub-application Ms being executed in the background. Then, using the launch function of the sub-application Ma being executed in the foreground, the application selected by the user on the coordinated menu screen is called up, based upon the received operation information and the application is executed in the foreground in place of the sub-application Ma.

However, if the user selects any of the icons "C", "E", "F" and "G" representing the unapproved applications in the coordinated menu screen in FIG. 6B, the corresponding application is not started up at the portable terminal 2. In other words, only an approved application can be selected and started up from the coordinated menu screen shown in FIG. 6B.

It is to be noted that if all the icons corresponding to the applications that can be executed at the portable terminal 2 cannot be displayed in a single page of the menu screen shown in FIG. 6A or the coordinated menu screen shown in FIG. 6B, the user is able to switch screen displays by performing a specific screen switching operation at the portable terminal 2. The specific screen switching operation performed by the user may be, for instance, a touch operation often referred to as a flick operation. The term "flick" operation is used to refer to a touch operation whereby the user strokes the screen along a specific direction, e.g., the left or right direction.

Upon detecting a screen switching operation performed as described above, the control unit 20 redraws the menu screen. At this time, the control unit 20 draws a menu screen containing icons different from those in the previous menu screen and brings it up on display at the display unit 21 as the menu screen resulting from the screen switch. Until all the icons that need to be displayed are brought up on display on the menu screen, the menu screen is switched as described above repeatedly in response to the screen switching operation performed by the user. Through these measures, all the icons corresponding to the applications that can be executed at the portable terminal 2 can be brought up on display on the menu screen.

The following advantages (1) through (9) are achieved through the embodiment of the present invention described above.

(1) In the in-car information system, the portable terminal 2 executes, by the control unit 20, the application manager 201 having a launch function for executing an application stored in the memory unit 24 in the foreground and a communication function for executing communication processing so as to enable the portable terminal 2 and the in-car device 1 to exchange information in the background. Through these measures, applications can be executed at the portable terminal 2 through coordinated operations at the portable terminal 2 and the in-car device 1 by assuring consistency in the quality of communication between the portable terminal 2 and the in-car device 1. In addition, an existing application can be used without modification.

(2) The application manager 201 includes the sub-application Ma having the launch function and the sub-application Ms having the communication function. The control unit 20 executes the sub-application Ma in the foreground and executes the sub-application Ms in the background. As a result, optimization in the function assignments within the application manager 201 is achieved.

(3) The portable terminal 2 outputs, via its video/audio signal output unit 26, an image corresponding to the application currently being executed in the foreground by the control unit 20 to the in-car device 1. On the other hand, the in-car device 1, along with displaying the image output from the portable terminal 2 at the display unit 11, inputs a user operation via the operation unit 12 and then transmits operation information corresponding to the user operation via the short-range wireless communication interface unit 15 to the portable terminal 2. As a result, an application can be executed through coordination between the portable terminal 2 and the in-car device 1.

(4) The sub-application Ma further has a regulatory information acquisition function that enables the control unit 20 to obtain regulatory information indicating the details of operational restrictions to be imposed on each application while the vehicle is in a traveling state, whereas the sub-application Ms further has an operational restriction function that enables the control unit 20 to determine the details of the operational restrictions to be imposed while the vehicle is in a traveling state for the application currently being executed in the foreground by referencing the regulatory information. The control unit 20 obtains the regulatory information provided in the form of a security policy (step 40) by using the regulatory information acquisition function of the sub-application Ma. Then, it uses the launch function explained earlier so as to call up an application other than the application manager 201 among the applications stored in the memory unit 24, and executes this application instead of the sub-application Ma in the foreground (steps 42 and 43). In addition, it uses the operational restriction function of the sub-application Ms so as to determine the details of the operational restrictions to be imposed in correspondence to the application while the vehicle is in a traveling state by referencing the security policy obtained in step 40 (steps 44 and 45) and then uses the communication function to transmit restriction information corresponding to the operational restriction details to the in-car device 1 (step 46). Based upon the restriction information transmitted from the portable terminal 2 in step 46 by the control unit 20, the in-car device 1 either allows or disallows image display at the display unit 11 and operation information transmission via the short-range wireless communication interface unit 15 (steps 47 and 48). Through these measures, it is ensured that driving safety is never compromised while the vehicle is traveling, due to an image or sound generated by the application being executed at the portable terminal 2 output at the in-car device 1.

(5) The control unit 20 at the portable terminal 2 draws a coordinated menu screen such as that shown in FIG. 6B, so as to allow the user to select an application to be executed in the foreground in place of the sub-application Ma, by using the launch function of the sub-application Ma. The video/audio signal output unit 26 outputs this coordinated menu screen to the in-car device 1. At the in-car device 1, the coordinated menu screen having been output from the portable terminal 2 is brought up on display at the display unit 11. The short-range wireless communication interface unit 15 transmits operation information that corresponds to an application selected by the user in the coordinated menu screen via the operation unit 12, to the portable terminal 2. The control unit 20 at the portable terminal 2 receives the operation information transmitted from the in-car device 1 through the communication function of the sub-application Ms. It then calls up the application selected by the user in the coordinated menu screen and executes this application instead of the sub-application Ma in the foreground through the launch function of the sub-application Ma. Since the in-car device 1 and the portable terminal 2 are allowed to operate in coordination with each other as described above, the user is able to select any application by operating the in-car device 1 and have the selected application executed at the portable terminal 2.

(6) The plurality of applications stored in the memory unit 24 are sorted in advance into a group of approved applications allowed to run in coordination with the in-car device 1 and a group of unapproved applications without the approved application designation. The control unit 20 draws the icons "A", "B", "D" and "H" representing approved applications and the icons "C", "E", "F" and "G" representing unapproved applications in the coordinated menu screen in FIG. 6B by adopting different display modes so as to allow one group to be easily distinguished from the other group. More specifically, when the portable terminal 2 is not connected to the in-car device 1, the OS 203 draws a menu screen such as that shown in FIG. 6A, whereas when the portable terminal 2 is connected with the in-car device 1, a coordinated menu screen such as that shown in FIG. 6B is drawn by engaging the launch function of the sub-application Ma. The icons "A", "B", "D" and "H" representing the approved applications in the coordinated menu screen in FIG. 6B are displayed in a display mode matching that of the menu screen shown in FIG. 6A, but the icons "C", "E", "F" and "G" representing the unapproved applications in the coordinated menu screen in FIG. 6B are displayed in a display mode different from that of the menu screen in FIG. 6A. As a result, the user is able to ascertain with ease that the icons representing the unapproved applications cannot be selected and that the corresponding unapproved application cannot be executed when the portable terminal 2 is connected to the in-car device 1.

(7) The control unit 20 arranges the icons "A", "B", "D" and "H" representing the approved applications and the icons "C", "E", "F" and "G" representing the unapproved applications intermingledly, with a predesignated positional arrangement in the menu screen in FIG. 6A. In the coordinated menu screen in FIG. 6B, on the other hand, it arranges the group of icons "A", "B", "D" and "H" representing the approved applications and the group of icons "C", "E", "F" and "G" representing the unapproved applications separately from each other. Through these measures, the icons representing the approved applications that the user is allowed to select can be displayed in the coordinated menu screen in a manner that facilitates user selection.

(8) The control unit 20 receives the traveling information indicating the traveling condition of the vehicle from the in-car device 1 through the communication function of the sub-application Ms (step 50). Then, corresponding to the traveling condition of the vehicle based upon the traveling information, it changes the image drawn by the application being executed in the foreground (step 52). As a result, images with different content, one suited for display while the vehicle is in a traveling state and the other suited for display when the vehicle is in a stationary state, can be output from the portable terminal 2 to the in-car device 1 and brought up on display at the in-car device 1 in correspondence to the application being executed.

(9) The portable terminal 2 in the in-car information system holds a plurality of applications stored in the memory unit 24. The control unit 20 draws a coordinated menu screen such as that shown in FIG. 6B, which enables the user to select an application to be executed among these applications and executes the application selected in this coordinated menu screen. The video/audio signal output unit 26 then outputs the coordinated menu screen image to the in-car device 1. At the in-car device 1, the coordinated menu screen image output from the portable terminal 2 is brought up on display at the display unit 11. The plurality of applications stored in the memory unit 24 of the portable terminal 2 in this in-car information system are each designated in advance either as an approved application, which is allowed to run in coordination with the in-car device 1 or as an unapproved application, which is other than the approved application. The control unit 20 sets the icons "A", "B", "D" and "H" representing the approved applications and the icons "C", "E", "F" and "G" representing the unapproved applications in separate groups in the coordinated menu screen shown in FIG. 6B. Through these measures, the icons representing the approved applications that the user is allowed to select can be displayed in the coordinated menu screen in a manner that facilitates user selection.

It is to be noted that various types of vehicle information output from the vehicle other than the vehicle speed signal and the parking signal may also be obtained by the in-car device 1 in the embodiment described above. Such vehicle information taken into the in-car device 1 may then be utilized in processing executed in the in-car device 1, or it may be output from the in-car device 1 to the portable terminal 2 and used in processing executed at the portable terminal 2. For instance, a startup condition indicated by such vehicle information may be set in advance in correspondence to each application and when vehicle information indicating a specific startup condition is output from the vehicle, the corresponding application may be started up automatically at the portable terminal 2. Information indicating the startup conditions for the individual applications may be transmitted from the portable terminal 2 to the in-car device 1 and a decision as to whether or not a startup condition exists may be made in the in-car device 1 based upon the vehicle information. As an alternative, the vehicle information may be transmitted from the in-car device 1 to the portable terminal 2 and the decision as to whether or not a startup condition exists may be made at the portable terminal 2 based upon the vehicle information. Such use of vehicle information makes it possible for the portable terminal 2 to automatically start up an application that, for instance, enables a search for gas stations located near the current position when vehicle information, indicating that the quantity of remaining fuel in the vehicle has become less than a predetermined quantity, is output from the vehicle.

In the embodiment described above, transmission of video signals and audio signals from the portable terminal 2 to the in-car device 1 is enabled by connecting the in-car device 1 and the portable terminal 2 with each other via the video/audio cable 3. In addition, the in-car device 1 and the portable terminal 2 communicate with each other through short-range wireless communication carried out in compliance with a predetermined communication standard such as Bluetooth in the embodiment described above. However, the present invention is not limited to these examples and may be adopted in conjunction with another communication method or another signal transmission method. For instance, video signals and audio signals originating from the portable terminal 2 may be transmitted to the in-car device 1 through wireless communication. In addition, communication between the in-car device 1 and the portable terminal 2 may be carried out through wired communication such as USB communication. In other words, the present invention may be adopted in conjunction with any communication method as long as it allows the in-car device 1 and the portable terminal 2 to exchange necessary signals and information.

In the embodiment described above, button information indicating the details of a button operation performed by the user or coordinate information indicating the position on the screen specified through a touch panel operation is transmitted as operation information from the in-car device 1 to the portable terminal 2 and the portable terminal 2 then determines the details of the user operation based upon the operation information. However, the present invention is not limited to this example and the in-car device 1 may instead determine the details of the user operation and then transmit an application startup command or an application end command to the portable terminal 2 based upon the user operation details thus determined.

Figure 7:
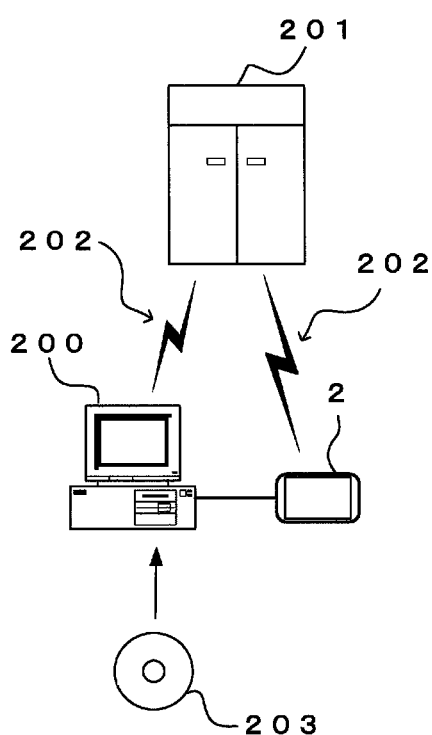
FIG. 7 shows how a program may be provided to a portable terminal.

It is to be noted that a program fulfilling the functions of the application manager achieved in the embodiment described above may be provided to the portable terminal 2 in a recording medium such as a CD-ROM or through an electric communication line such as the Internet. FIG. 7 shows how such a program may be provided. A personal computer 200, which is connected with the portable terminal 2, provides the application manager program made available from a server apparatus 201 via a communication line 202, or from a CD-ROM 203 to the portable terminal 2. In addition, the application manager program available at the server apparatus 201 may be directly provided to the portable terminal 2 through the communication line 202 by bypassing the personal computer 200. The communication line 202 may be the Internet, a communication network for personal computer communication or the like, a dedicated communication line, a portable telephone network or the like. The server 201 transmits the application manager program to the personal computer 200 or the portable terminal 2 via the communication line 202. Namely, the program converted to a data signal on a carrier wave is transmitted via the communication line 202. In other words, the application manager program, which can be executed at the portable terminal 2, may be provided as a computer-readable program product assuming any of various modes including a recording medium and a carrier wave.

The embodiment and variations thereof described above simply represent examples and as long as features characterizing the present invention remain intact, the present invention is in no way limited to the particulars of the embodiment and variations. In addition, the embodiment and the variations thereof may be adopted in any combination.

What is claimed is:

1. An in-car information system including a portable information terminal and an in-car device, wherein the information terminal comprises:
a storage unit in which applications are stored; and
a control unit that executes an application manager having a launch function that enables selection of an application among the applications stored in the storage unit and execution of the selected application in a foreground and having a communication function that enables execution of communication processing in a background to allow the information terminal and the in-car device to exchange information, wherein:
the application manager includes a first sub-application having the launch function and a second sub-application having the communication function;
the control unit executes the first sub-application or the selected application in the foreground and executes the second sub-application in the background;
the information terminal further comprises an image output unit that outputs an image corresponding to the first sub-application or the selected application being executed in the foreground by the control unit to the in-car device;
the in-car device further comprises a display unit that displays the image output from the information terminal, an operation input unit via which an operation performed by a user is input, and an operation information transmission unit that transmits operation information corresponding to the operation input via the operation input unit to the information terminal;
the first sub-application also has a regulatory information acquisition function that enables the control unit to obtain regulatory information indicating details of operational restrictions to be imposed on each of the applications while a vehicle is in a traveling state;
the second sub-application also has an operational restriction function that enables the control unit to determine the details of the operational restrictions to be imposed while the vehicle is in the traveling state for the application currently being executed in the foreground by referencing the regulatory information;
the control unit:
obtains the regulatory information by using the regulatory information acquisition function;
calls up one of the applications other than the application manager, among the applications stored in the storage unit and executes the one of the applications instead of the first sub-application in the foreground by using the launch function;
references the obtained regulatory information to determine the details of the operational restrictions to be imposed on the application while the vehicle is in the traveling state by using the operational restriction function; and transmits restriction information corresponding to the details of the operational restrictions to the in-car device by using the communication function; and the in-car device either allows or disallows display of the image at the display unit and transmission of the operation information via the operation information transmission unit based upon the restriction information transmitted by the control unit from the information terminal.

2. An in-car information system according to claim 1, wherein:

the control unit draws a menu screen that will allow the user to select another application of the applications to be executed in the foreground in place of the first sub-application by using the launch function;

the image output unit outputs the menu screen to the in-car device;

the display unit displays the menu screen output from the image output unit;

the operation information transmission unit transmits operation information that corresponds to the another application selected by the user via the operation input unit in the menu screen brought up on display at the display unit to the information terminal; and the control unit receives the operation information that corresponds to the another application transmitted by the operation information transmission unit by using the communication function, calls up the another application selected by the user in the menu screen, based upon the operation information having been received, and executes the another application in the foreground in place of the first sub-application by using the launch function.

3. An in-car information system according to claim 2, wherein:

the applications are sorted in advance into a group of approved applications, which are allowed to run in coordination with the in-car device, and a group of unapproved applications other than the approved applications; and the control unit draws icons representing the approved applications and icons representing the unapproved applications in the menu screen by adopting different display modes so as to ensure that one group of the icons is visually distinct from another group of the icons.

4. An in-car information system according to claim 3, wherein:

an operating system that is used to control operations of the control unit is also stored in the storage unit; and the control unit:

draws a first menu screen that is used for the user to select, on a screen at the information terminal, a third application of the applications to be executed in the foreground, by using the operating system when the information terminal is not connected to the in-car device;

draws a second menu screen that is used for the user to select, on a screen either at the in-car device or at the information terminal, the third application of the applications to be executed in the foreground, by using the launch function when the information terminal is connected to the in-car device;

adopts identical display modes in the first menu screen and in the second menu screen for the icons representing the approved applications; and adopts the different display modes in the first menu screen and in the second menu screen for the icons representing the unapproved applications.

5. An in-car information system according to claim 4, wherein the control unit:

arranges the icons representing the approved applications and the icons representing the unapproved applications intermingledly with a predesignated positional arrangement in the first menu screen; and arranges a group of the icons representing the approved applications and a group of the icons representing the unapproved applications separately from each other in the second menu screen.

6. An in-car information system according to claim 2, wherein:

the applications are sorted in advance into a group of approved applications, which are allowed to run in coordination with the in-car device, and a group of unapproved applications other than the approved applications; and the control unit arranges a group of icons representing the approved applications and a group of icons representing the unapproved applications separately from each other in the menu screen.

7. An in-car information system according to claim 1, wherein the control unit:

receives traveling information indicating a traveling condition of a vehicle from the in-car device by using the communication function; and changes an image drawn by the selected application being executed in the foreground in correspondence to the vehicle traveling condition ascertained based upon the traveling information having been received.

8. An information terminal, comprising:

a storage unit in which applications are stored; and a control unit that executes an application manager having a launch function that enables selection of an application among the applications stored in the storage unit and execution in a foreground of the selected application, and having a communication function that enables execution in a background of communication processing to allow the information terminal and an in-car device to exchange information, wherein:

the application manager includes a first sub-application having the launch function and a second sub-application having the communication function;

the control unit executes the first sub-application or the selected application in the foreground and executes the second application in the background;

the information terminal further comprises an image output unit that outputs an image corresponding to the first sub-application or the selected application being executed in the foreground by the control unit to the in-car device;

the in-car device further comprises a display unit that displays the image output from the information terminal, an operation input unit via which an operation performed by a user is input, and an operation information transmission unit that transmits operation information corresponding to the operation input via the operation input unit to the information terminal;

the first sub-application also has a regulatory information acquisition function that enables the control unit to obtain regulatory information indicating details of operational restrictions to be imposed on each of the applications while a vehicle is in a traveling state;

the second sub-application also has an operational restriction function that enables the control unit to determine the details of the operational restrictions to be imposed while the vehicle is in the traveling state for the application currently being executed in the foreground by referencing the regulatory information;

the control unit:
  obtains the regulatory information by using the regulatory information acquisition function;
  calls up one of the applications other than the application manager, among the applications stored in the storage unit and executes the one of the applications instead of the first sub-application in the foreground by using the launch function;
  references the obtained regulatory information to determine the details of the operational restrictions to be imposed on the application while the vehicle is in the traveling state by using the operational restriction function; and
  transmits restriction information corresponding to the details of the operational restrictions to the in-car device by using the communication function; and the in-car device either allows or disallows display of the image at the display unit and transmission of the operation information via the operation information transmission unit based upon the restriction information transmitted by the control unit from the information terminal.

9. An application execution method adopted in an in-car information system including a portable information terminal and an in-car device, comprising:

storing applications in advance in the information terminal; and executing by the information terminal an application manager having a launch function that enables selection of an application among the stored applications and execution of the selected application in a foreground, and having a communication function that enables execution of communication processing in a background to allow the information terminal and the in-car device to exchange information, so that the application is selected and executed at the information terminal by using the launch function and information corresponding to the selected application is exchanged between the information terminal and the in-car device by using the communication function, wherein:

the application manager includes a first sub-application having the launch function and a second sub-application having the communication function; and the information terminal executes the first sub-application or the selected application in the foreground and executes the second sub-application in the background;

the information terminal comprises an image output unit that outputs an image corresponding to the first sub-application or the selected application being executed in the foreground by a control unit to the in-car device;

the in-car device comprises a display unit that displays the image output from the information terminal, an operation input unit via which an operation performed by a user is input, and an operation information transmission unit that transmits operation information corresponding to the operation input via the operation input unit to the information terminal;

the first sub-application also has a regulatory information acquisition function that enables the control unit to obtain regulatory information indicating details of operational restrictions to be imposed on each of the applications while a vehicle is in a traveling state;

the second sub-application also has an operational restriction function that enables the control unit to determine the details of the operational restrictions to be imposed while the vehicle is in the traveling state for the application currently being executed in the foreground by referencing the regulatory information;

the control unit:
  obtains the regulatory information by using the regulatory information acquisition function;
  calls up one of the applications other than the application manager, among the applications stored in the storage unit and executes the one of the applications instead of the first sub-application in the foreground by using the launch function;
  references the obtained regulatory information to determine the details of the operational restrictions to be imposed on the application while the vehicle is in the traveling state by using the operational restriction function; and
  transmits restriction information corresponding to the details of the operational restrictions to the in-car device by using the communication function; and the in-car device either allows or disallows display of the image at the display unit and transmission of the operation information via the operation information transmission unit based upon the restriction information transmitted by the control unit from the information terminal.

* * * * *